United States Patent
Kusase et al.

Patent Number: 6,147,430
Date of Patent: Nov. 14, 2000

[54] STATOR OF AC GENERATOR FOR VEHICLE

[75] Inventors: Shin Kusase, Obu; Atsushi Umeda, Okazaki; Tsutomu Shiga, Nukata-gun; Hiroshi Ishida, Anjo; Yoshio Naka, Toyota; Shinichi Matsubara, Anjo, all of Japan

[73] Assignee: Denso Corporation, Kariya, Japan

[21] Appl. No.: 09/314,886

[22] Filed: May 19, 1999

[30] Foreign Application Priority Data

May 25, 1998 [JP] Japan ................ 10-143008
Jun. 26, 1998 [JP] Japan ................ 10-180755

[51] Int. Cl.$^7$ .............................. H02K 3/15; H02K 1/04
[52] U.S. Cl. .................................. 310/215; 310/201
[58] Field of Search ........................... 310/179, 180, 310/195, 201, 203, 208, 214, 215, 254, 258, 259, 260; 29/596, 598, 597

[56] References Cited

U.S. PATENT DOCUMENTS

| | | | |
|---|---|---|---|
| 1,789,128 | 1/1931 | Apple | 310/201 |
| 1,822,261 | 9/1931 | Apple | 310/201 |
| 1,826,295 | 10/1931 | Apple | 310/201 |
| 1,843,591 | 2/1932 | Aplle | 310/201 |
| 2,361,842 | 10/1944 | Hientz et al. | 310/201 |
| 2,407,935 | 9/1946 | Perfetti et al. | 310/201 |
| 2,928,963 | 3/1960 | Bertsche et al. | 310/168 |
| 3,634,708 | 1/1972 | Fisher | 310/265 |
| 3,745,394 | 7/1973 | Mason | 310/215 |
| 5,097,167 | 3/1992 | Kanayama et al. | 310/201 |
| 5,587,619 | 12/1996 | Yamiyama et al. | 310/201 |
| 5,845,389 | 12/1998 | Roberts et al. | 29/596 |

FOREIGN PATENT DOCUMENTS

| | | |
|---|---|---|
| 0 006 514 | 1/1980 | European Pat. Off. . |
| 1.091.544 | 4/1955 | France . |
| 4-17539 | 1/1949 | Japan . |
| 50-47102 | 4/1975 | Japan . |
| 62-272836 | 11/1987 | Japan . |
| 63-274335 | 11/1988 | Japan . |
| 64-5340 | 1/1989 | Japan . |
| 8-205441 | 8/1996 | Japan . |
| 1194085 | 6/1970 | United Kingdom . |
| 92/06527 | 4/1992 | WIPO . |

OTHER PUBLICATIONS

Patent Abstracts of Japan vol. 008, No. 256 (E–280), Nov. 22, 1984 (1984–11–22) & JP 59 129548 A (Nippon Denso KK), Jul. 25, 1984 (1984–07–25).

Patent Abstracts of Japan vol. 008, No. 256 (E–280), Nov. 8, 1984 (1984–11–08) & JP 59 123330 A (Hitachi Seisakusho KK), Jul. 14, 1984 (1984–07–14).

Patent Abstracts of Japan vol. 007, No. 280 (E–216), Dec. 14, 1983 (1983–12–14) & JP 58 157349 A (Tokyo Shibaura Denki KK), Sep. 19, 1983 (1983–09–19).

Patent Abstracts of Japan vol. 010, No. 233 (E–247), Aug. 13, 1986 (1986–08–13) & JP 61 066553 A (Mitsubishi Electric Corp), Apr. 5, 1986 (1986–04–05).

*Primary Examiner*—Nestor Ramirez
*Assistant Examiner*—Tran N Nguyen
*Attorney, Agent, or Firm*—Pillsbury Madison & Sutro LLP

[57] ABSTRACT

In a stator of an ac generator for vehicle, a plurality of insulators are disposed in the slots of the stator to insulate the stator winding from the stator core. Each of the insulators has a smooth edge at one end and a stopper portion at the other end. The stopper portions project from an axial end of the stator core from which conductor segments of the stator winding are inserted. The conductor segments can be inserted into the slots with the smooth edges being at the head and can be easily positioned in the slots by the stopper.

4 Claims, 8 Drawing Sheets

STATOR OF AC GENERATOR FOR VEHICLE

CROSS REFERENCE TO RELATED APPLICATION

The present application is based on and claims priority from Japanese Patent Applications Hei 10-143008 filed on May 25, 1998 and Hei 10-180755 filed on Jun. 26, 1998, the contents of which are incorporated herein by reference.

BACKGROUND OF THE INVENTION

1. Field of the Invention

The present invention relates to an ac generator for a passenger car, a track, or other vehicles that is driven by an internal combustion engine.

2. Description of the Related Art

It is known that a stator winding of an ac generator for a vehicle is formed of a plurality of conductor segments which are welded together. WO92/06527 discloses an example of such a stator winding, in which each of the conductor segments is inserted from one end of the stator core, the ends of conductor segments are welded to one another at the other end of the stator core. Usually, insulators are inserted into slots of the stator core. JP-A-4-17539 discloses insulators, each of which has a U-shape cross section and folded lips formed at opposite ends thereof. The folded lips position the insulator in the slots easily.

However, it is difficult to insert the insulators into the slots because the insulator disclosed in JP-A-4-17539 has folded lips at opposite ends thereof. While it is easy to insert an insulator having no such folded lips into the slots, it is difficult to position such an insulator in the axial direction. If an attempt is made to fold an end of the insulators after the conductor segments are inserted into the slots, the folded portion may be damaged due to folding pressure. Thus, the conductor segments can not be insulated from the stator core very well by a single sheet of insulator film.

SUMMARY OF THE INVENTION

Therefore, an object of the invention is to provide an improved stator of an ac generator for a vehicle in which insulators can be installed and positioned easily without damage.

According to a main feature of the invention, each of a plurality of insulators disposed in slots has a smooth end portion extending from one axial end of the stator core and a stopper engaging the other axial end of the stator core.

In the ac generator, stator winding may be composed of a plurality of conductor segments having a U-turn portion disposed at one end of the stator core, and the stopper portion is disposed at the same end as the U-turn portion.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

An embodiment of the present invention is described with reference to the appended drawings.

Figure 1:
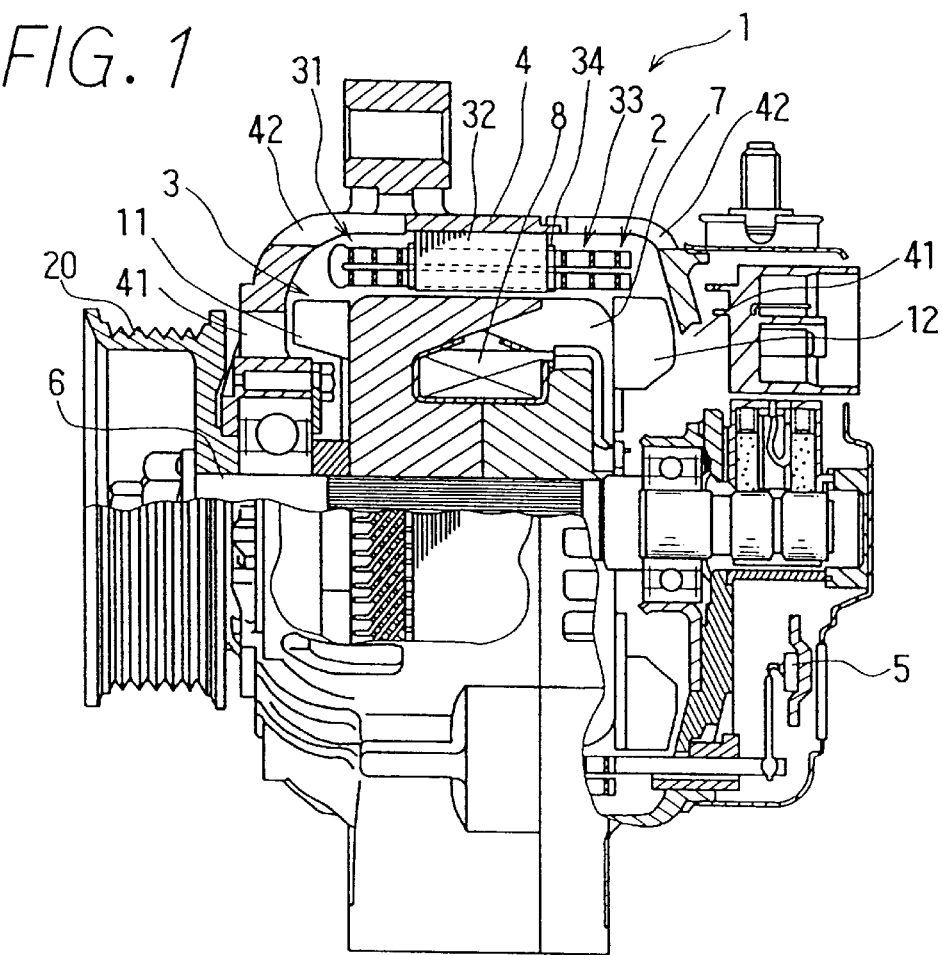
FIG. 1 is a cross-sectional view illustrating an ac generator for a vehicle according to a first embodiment of the invention.

As shown in FIG. 1, ac generator 1 according to a first embodiment of the invention includes stator 2, rotor 3, frame 4, rectifier 5, etc.

Stator 2 is composed of stator core 32, a plurality of conductor segments 33 and a plurality of insulators 34. Stator core 32 is a lamination of steel plates having a number of slots formed inside thereof. The portion of conductor segments projecting from stator core 32 form coil ends 31.

Rotor 3 has field coil 8, a pair of pole cores 7, and shaft 6. Each of the pair of pole cores 7 has six claw pole pieces extending axially to enclose field coil 8. Field coil 8 is composed of a cylindrically-wound insulation-coated copper wire. Axial flow type cooling fan 11 is welded to the front side pole core 7 to supply cooling air from the front side thereof in both the radial and axial directions. Centrifugal cooling fan 12 is welded to the rear side pole core 7 to supply cooling air from the rear side thereof radially outward.

Frame 4 accommodates stator 2 and rotor 3 and supports rotor 3 to rotate with shaft 6. Stator 2 is fixed to frame 4 around the pair of pole cores 7 at a certain gap therefrom. Frame 4 has air discharge vents 42 at portions opposite coil ends 31 of stator 2 and air intake vents 41 at the axial ends thereof.

AC generator 1 described above is rotated in a certain direction by an engine (not shown) via a belt and a pulley 20. When field coil 8 is energized by an outside power source, pole cores 7 are excited so that the stator winding provides a three-phase ac voltage. Accordingly, rectifier 5 provides a certain amount of dc current at the output terminals.

Figure 2:
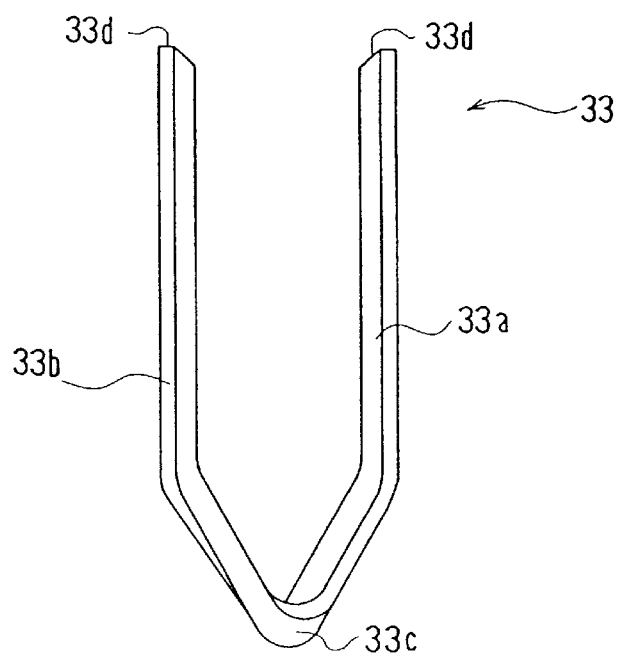
FIG. 2 is a perspective view of a U-shaped conductor segment forming a part of a stator winding of the stator according to the first embodiment.

As illustrated in FIG. 2, conductor segment 33 is a U-shaped member made of copper bar or plate. Conductor segment 33 has inner conductor portion 33a, outer conductor portion 33b and U-turn portion 33c. Each of inner conductor portion 33a and outer conductor portion 33b has straight inner portion disposed in slot 35 and outer portion disposed outside slot 35.

Figure 3:
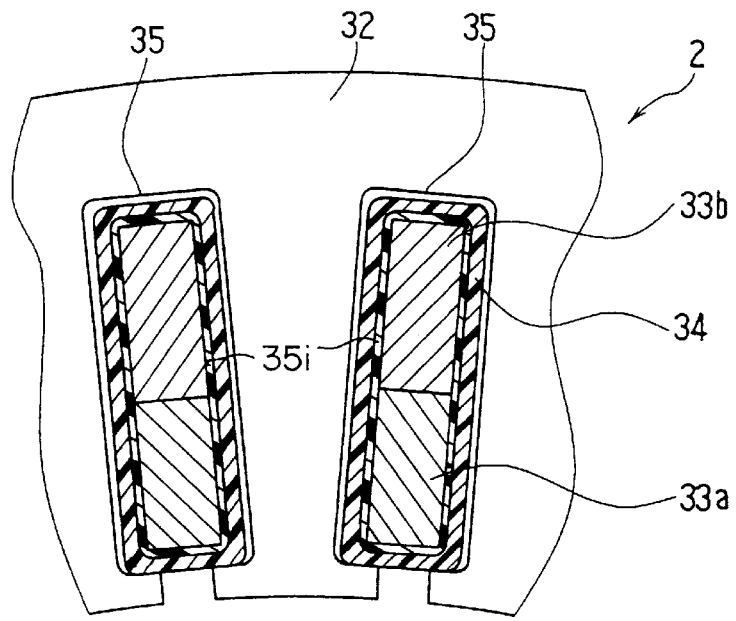
FIG. 3 is a fragmentary cross-sectional view of the stator according to the first embodiment.

A pair of conductor segments 33 is disposed in each one of slots 35 and connected to one another in a well known manner to form the stator winding. As illustrated in FIG. 3, inner and outer conductor portions 33a, 33b of conductor segment 33 a rectangular cross-section. The circumferential sides of conductor segment 33 are longer than its radial sides. Conductor segments 33 are coated with insulation film 33i to insulates one segment from another. Insulators 34 insulate conductor segments 33 from the stator core 32.

Figure 4:
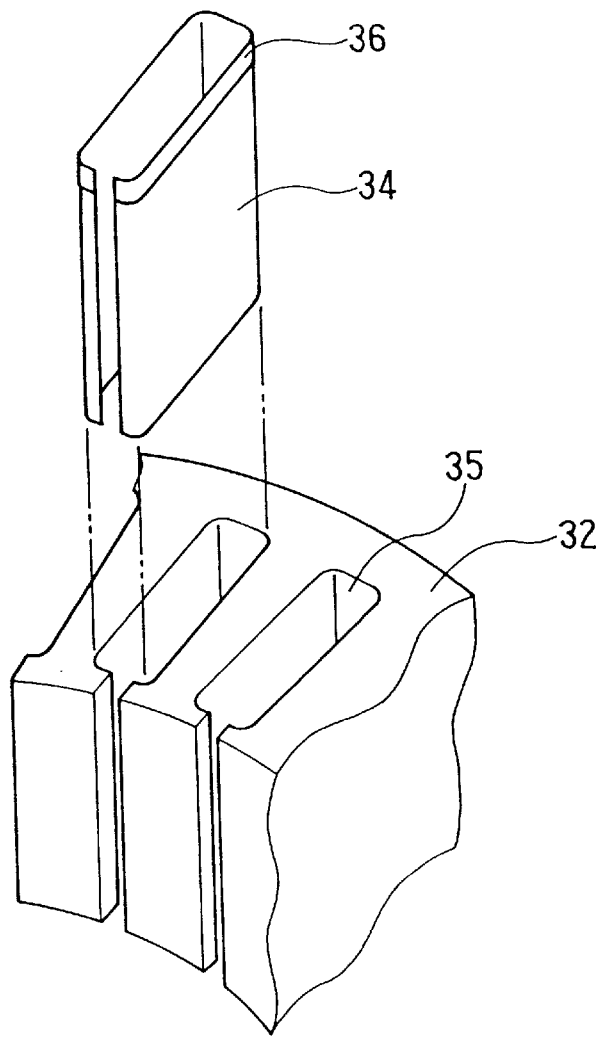
FIG. 4 is a perspective view illustrating an insulator to be inserted into one of slots of a stator core of the stator according to the first embodiment.
Figure 5A:
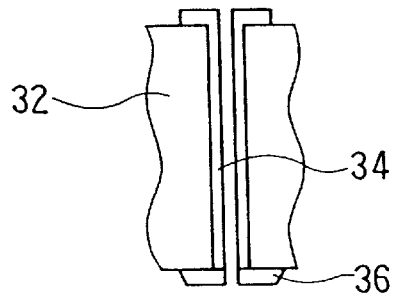
FIG. 5A is a fragmentary side view of a portion of the stator core and an insulator.
Figure 5B:
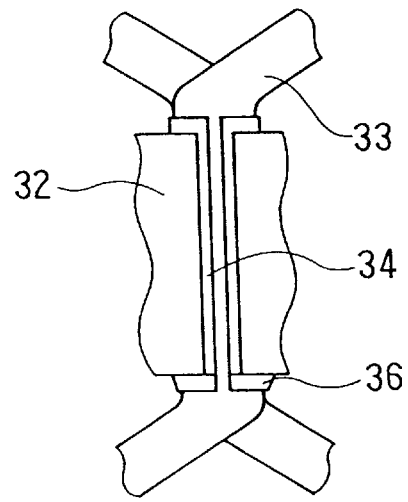
FIG. 5B is a fragmentary side view of a portion of the stator with conductor segments disposed in one of the slots.
Figure 7:
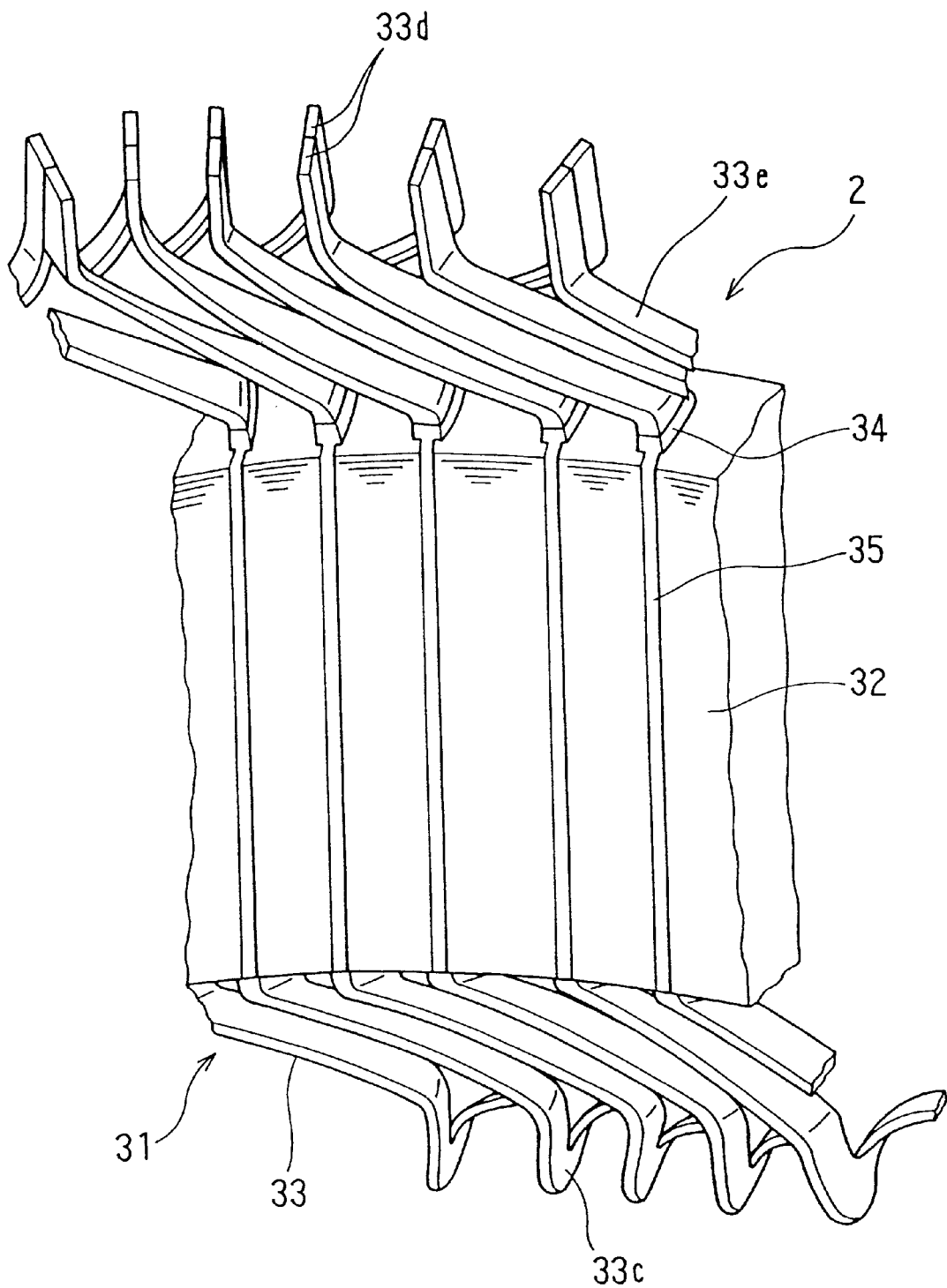
FIG. 7 is a perspective view illustrating coil ends disposed at opposite ends of the stator according to the first embodiment.

Column-shaped insulator 34 is made of a resinous sheet, which is rolled to fit the slot as shown in FIG. 4. Insulator 34 has a smooth edge at one end and outwardly folded lip 36 at the other end thereof. Insulator 34 is inserted into slot 35 in the axial direction with the smooth edge being at the head. Folded lip 36 functions as a stopper or positioner of insulator 34. Insulator 34 is inserted into slot 35 until folded lip 36 engages an end of stator core 32 so that both ends of insulator 34 can project from stator core 32 as shown in FIG. 5A. Subsequently, conductor segments 33 are inserted therein as shown in FIG. 5B and welded to form stator winding. Accordingly, conductor segments 33 are insulated from edge portions of stator core 32 by the projected portions of insulator 34. Here, folded lip 36 of insulator 34 is disposed at the side of stator core 32 where U-turn portion 33c is located. In other words, conductor segments 33 are inserted in the same direction as insulators 34 are inserted.

Figure 6:
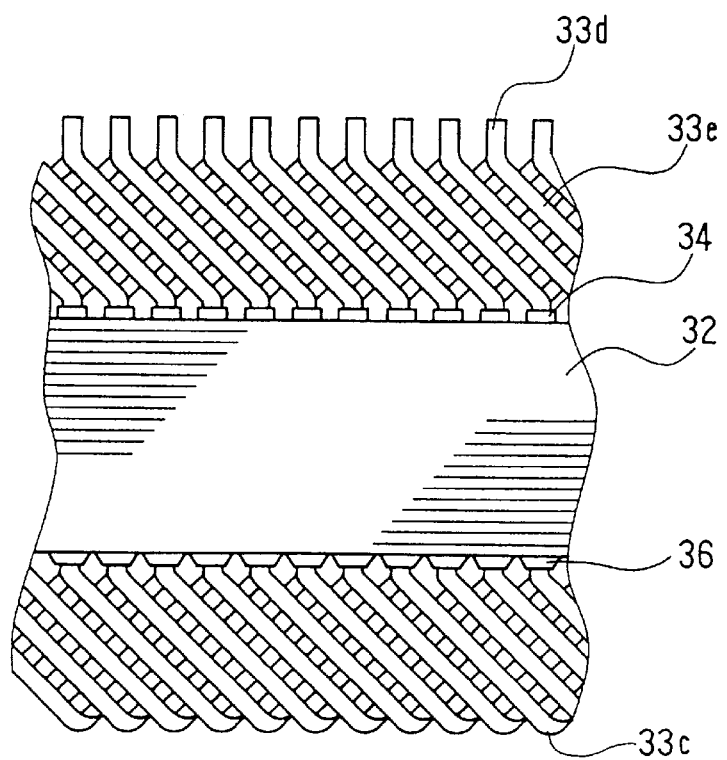
FIG. 6 is a fragmentary side view of a portion of the stator according to the first embodiment of the invention.

As illustrated in FIG. 6, U-turn portions 33c are disposed at one axial end of stator core 32 and opposite ends 33d are disposed at the other end thereof. Each of conductor segments 33 has slant portion 33e forming coil end 31 at one end of stator core 2. Slant portions 33e of conductor segments 33 disposed in the outer layers extend in the same direction, while slant portions 33e disposed in the inner layers extend in the different direction. Ends 33d of conductor segments 33 are welded by ultrasonic wave welder or arc welder, or are soldered or mechanically connected.

As shown in FIG. 4, one of insulators 34 is inserted to each of slots 35. Conductor segments 33 are made of copper plates, each of which is bent by a press machine to form a U-shape. A number of U-shaped conductor segments 33 are lined up so that U-turn portions 33c can be disposed at the same end of stator core 32. Conductor segments 33 are press-fitted into respective slots 35 so that outer and inner conductor portions 33b, 33a can fit the parallel walls of slot 35 via insulators 34 on the opposite surfaces thereof. As shown in FIG. 3, outer conductor portions 33b are inserted into the inner side of slots 35 that are insulated by insulators 34, and inner conductor portions 33a are inserted into the outer side of slots 35. Thereafter, two end portions 33d are bent in the opposite directions respectively to connect to end portions 33d of other conductor segments 33 in different layers.

Because insulator 34 has folded lip 36 at one end thereof and the other smooth end, insulator 34 can be inserted into the slot very easily. Moreover, assembling tools can be arranged in the axial direction if insulators 34 are inserted in the same axial direction as conductor segments 33 are inserted.

Thus, folded lips 36 engage, as stoppers, the end of stator core 32 when conductor segments 33 are fully inserted into slots 35 to position insulators 34 correctly.

Folded lips 36 can be located opposite the U-turn portion or the end from which conductor segments 33 are inserted. Folded lips 36 protect insulators 34 from pressure applied when end portions 33d are bent.

Figure 8:
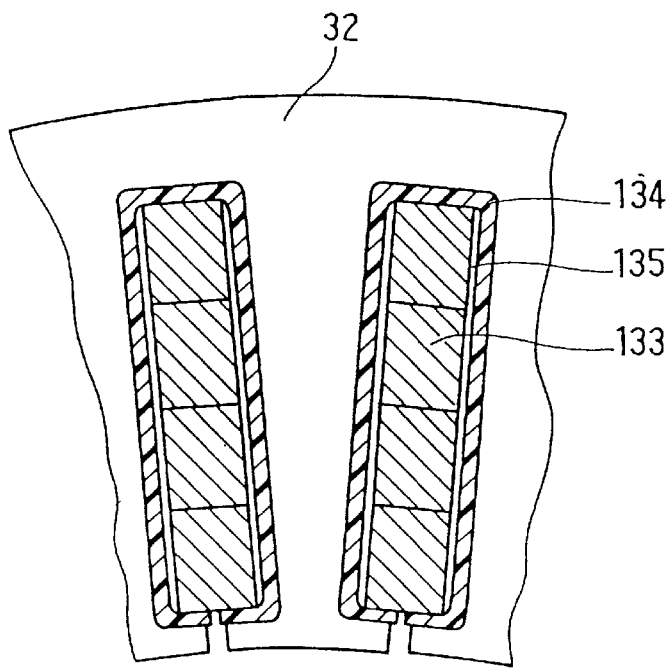
FIG. 8 is a fragmentary cross-sectional view of a portion of the stator according to a second embodiment of the invention.
Figure 9:
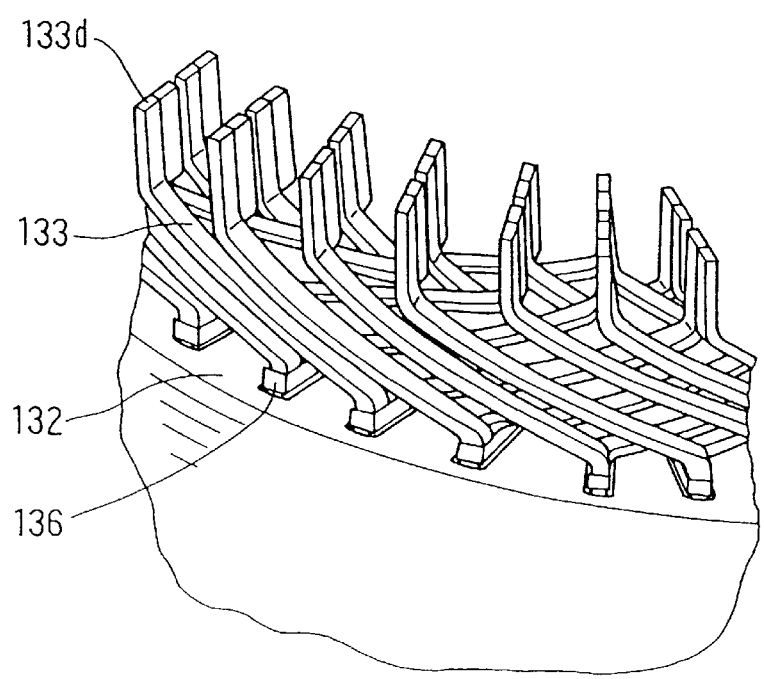
FIG. 9 is a fragmentary perspective view of the stator according to the second embodiment.

The number of conductor segments in each of the slots can be increased. A stator according to a second embodiment of the invention has four conductor segments 133 each of the slots as shown in FIG. 8. Four conductor segments 133 are lined up in the radial direction in each of slots 135 and connected in the manner illustrated in FIG. 9. Each of four conductor segments 133 extends from one of slots 135 in the alternately opposite direction. Conductor segments 133 on this side of FIG. 9 extend clockwise and those on the opposite side extend counterclockwise. End portion 133d of one conductor segment 133 is connected to end portion 133d of another conductor segment 133 spaced apart at a certain pitch. One of conductor segments 133 in the innermost layer is connected to another in the second inner layer, and one of conductor segments 133 in the third layer is connected to another in the outermost layer. FIG. 9 illustrates a portion of stator opposite the end from where conductor segments are inserted and folded lips 136 of insulators 134.

Figure 10:
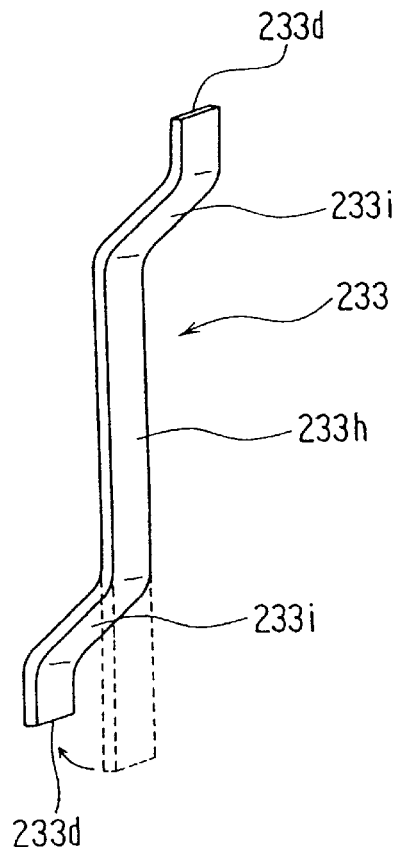
FIG. 10 is a perspective view illustrating a modified conductor segment.
Figure 11:
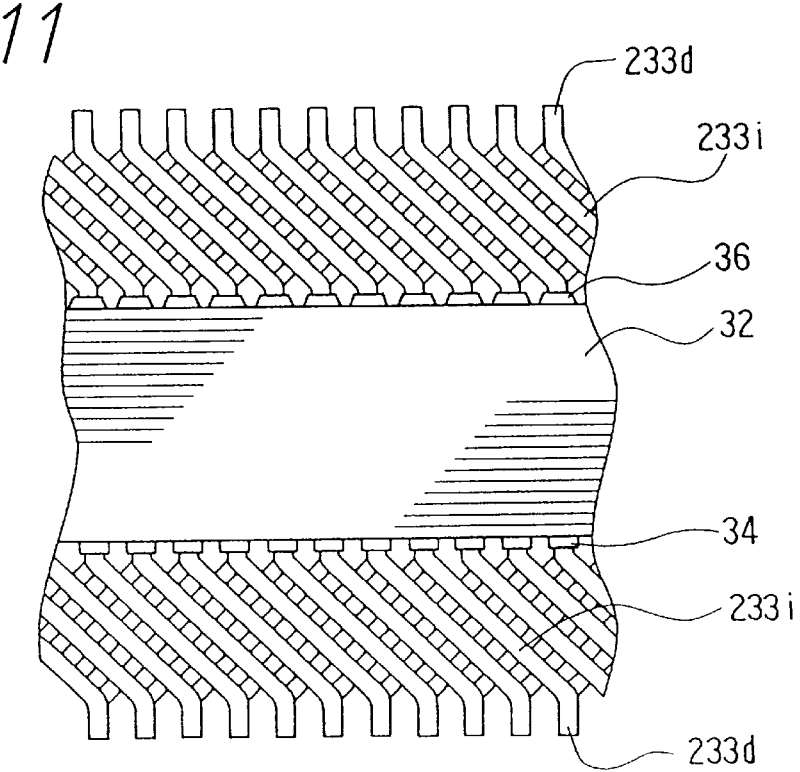
FIG. 11 is a fragmentary view of the stator having a plurality of the modified conductor segments shown in FIG. 10.

U-shaped conductor segment 33 can be substituted by a pair of turn-less conductor segments, which is welded after being assembled. FIG. 10 is a perspective view which illustrates I-shaped or J-shaped conductor segment 233. Conductor segment 233 has straight inside portion 233h and outside portions 233i extending outward from opposite ends of inside portion 233h.

One of outside portions 233i is bent from the dotted state. End portion 233d of one conductor segment 233 is connected to end portion 233d of another conductor segment 233 disposed in another slot to form a stator winding. Conductor segments 233 are simple in shape and easy to manufacture. Because each of conductor segments 233 corresponds to one of insulators 34, it is easy to insert insulators 34 and conductor segments 233 into slots 35.

Figure 12:
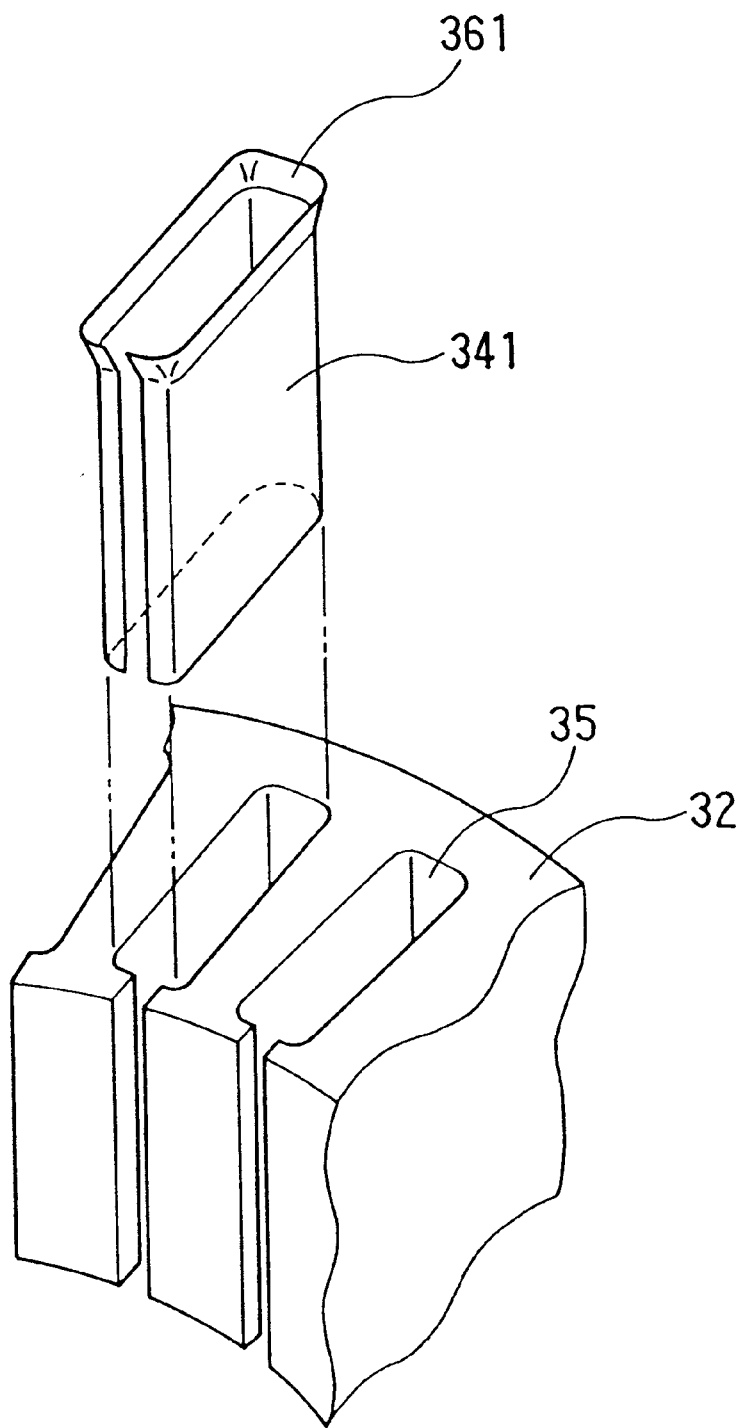
FIG. 12 is a perspective view illustrating a variation of the insulator to be inserted into one of slots of a stator core of the stator according to the first embodiment.
Figure 13:
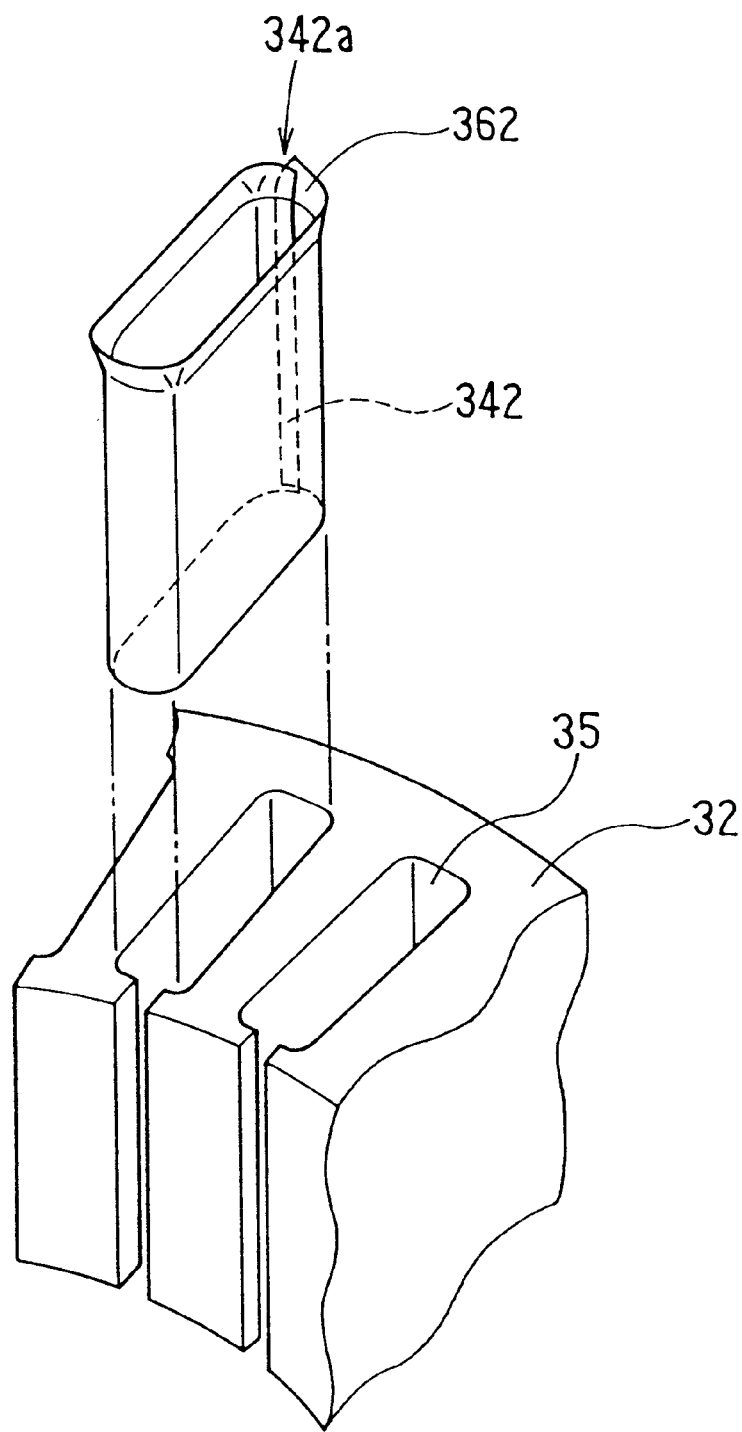
FIG. 13 is a perspective view illustrating a variation of an insulator to be inserted into one of slots of a stator core of the stator according to the first embodiment.

Insulator 34 described above can be substituted by open insulator 341 having flared lip 361 shown in FIG. 12 or by closed insulator 342 having flared lip 362 shown in FIG. 13. Flared lips 361, 362 can be formed after the insulators are inserted into slots 35 easily without interference with each other. Each of flared lips 361 and 362 functions as a stopper to prevent the insulator from being dragged into slot 35 when conductor segment 33 is fully inserted into slot 35.

As shown in FIG. 13, overlapping portion 342a of closed insulator 342 is disposed remote from the opening of slot 35. This structure is effective to shut out water.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A stator of an ac generator for vehicle comprising:
    a stator core having a plurality of slots having an opening;
    a plurality of insulation-film-coated conductor segments having a U-turn portion, a pair of straight portions disposed in said plurality of slots, each of said pair of straight portions having an end inserted from one end of said stator core into one of said plurality of slots; and
    a plurality of column-shaped insulators disposed in said plurality of slots to insulate said conductor segments from said stator core, each of said plurality of insulators having an outer periphery fitted to one of said plurality of slots, a smooth end portion extending from another end of said stator core and a stopper portion engaging said one end of said stator core;

wherein said stopper portion comprises a flared lip member which gradually widens as said flared lip member extends from said one end of said stator core; and wherein each of said insulators has an overlapping portion disposed remote from said opening of one of said plurality of slots.

2. The ac generator as claimed in claim 1, wherein each of said plurality of slots has parallel walls and each of said pair of straight portions fits said parallel wall of one of said slots via one of said insulators.

3. The ac generator as claimed in claim 1, wherein each of said plurality of slots is formed by side walls extending in the longitudinal direction of said stator core and said flared lip member gradually widens as it extends from said one end of said stator core and from all of said side walls.

4. The ac generator as claimed in claim 1, wherein all portions of said flared lip member gradually widens as said flared lip member extends from said one end of said stator core.

* * * * *